UNITED STATES PATENT OFFICE.

CHARLES McBURNEY, OF ROXBURY, MASSACHUSETTS.

APRON FOR PRINTING-PRESSES.

Specification forming part of Letters Patent No. 26,854, dated January 17, 1860.

*To all whom it may concern:*

Be it known that I, CHARLES MCBURNEY, of Roxbury, in the county of Norfolk and State of Massachusetts, have invented a certain Improvement in the Manufacture of Aprons for Printing-Machines, of which the following is a full, clear, and exact description.

The india-rubber aprons now extensively employed in machines for printing books and fabrics are liable to several objections, among which may be enumerated the following: First, after use for a short time the blanket is liable to become hard and to break and crack, by which the integrity of the surface, so essential to its perfect operation, is impaired; secondly, their great delicacy of surface renders them extremely liable to injury from handling and from contact with rough machinery or the floor, to all of which they are much exposed; and, thirdly, the above-mentioned difficulties are increased by the fact that it is always difficult, and in some cases impossible, to make repairs upon them.

To remove these objections and to produce a surface that shall possess greater toughness and be less liable to injury from any of the before-mentioned causes is the object of my present invention, which consists in covering the blanket with a layer of a peculiar fibrous compound, which furnishes a surface tough and not easily injured by handling or by coming in contact with rigid substances.

To enable others skilled in the art to understand my invention, I will proceed to describe the manner in which I have carried it out.

The blanket is made in any suitable manner with successive layers of canvas or cotton cloth and india-rubber, and is then covered upon one or both sides with a composition made as follows: Take clean cotton cloth and coat it with twice its weight of an india-rubber compound that will vulcanize, all the materials employed being clean and of the best quality. The cloth and india-rubber are then to be ground together until the fibers of the cotton are thoroughly mixed with the india-rubber, and of the fibrous compound thus produced I form the face of my blanket, which, after being vulcanized, is finished by grinding to bring it to an even surface and uniform thickness. The face thus produced is much tougher and less liable to be cracked or injured by handling or by coming in contact with rigid bodies than where composed of india-rubber compound without the fibers.

In lieu of employing new cotton-cloth in the manufacture of the fibrous compound for the face of the blanket, cuttings or waste pieces of gum-coated cloth may be employed; but I prefer to use new cloth, as I thus produce my materials perfectly clean and in the exact proportions required.

What I claim as my invention, and desire to secure by Letters Patent, is—

A blanket for printing-machines, having a fibrous surface, as set forth, operating as described.

CHAS. McBURNEY.

Witnesses:
SAML. COOPER,
P. E. TESCHEMACHER.